United States Patent
Ahn et al.

(10) Patent No.: US 11,230,169 B2
(45) Date of Patent: Jan. 25, 2022

(54) SYSTEM AND METHOD FOR CONTROLLING WINDOW TRANSPARENCY OF VEHICLE ACCORDING TO RECOGNITION OF DRIVER'S GAZE

(71) Applicant: HYUNDAI MOBIS CO., LTD., Seoul (KR)

(72) Inventors: Sung Joon Ahn, Yongin-si (KR); Seung Hwan Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 16/920,539

(22) Filed: Jul. 3, 2020

(65) Prior Publication Data

US 2021/0001697 A1 Jan. 7, 2021

(30) Foreign Application Priority Data

Jul. 4, 2019 (KR) ........................ 10-2019-0080773

(51) Int. Cl.

| | | |
|---|---|---|
| *G02F 1/163* | (2006.01) | |
| *B60J 3/04* | (2006.01) | |
| *B60W 40/08* | (2012.01) | |
| *B60J 1/20* | (2006.01) | |
| *B60J 1/18* | (2006.01) | |
| *B60J 1/02* | (2006.01) | |
| *G01C 21/36* | (2006.01) | |
| *G02B 27/01* | (2006.01) | |

(Continued)

(52) U.S. Cl.
CPC . *B60J 3/04* (2013.01); *B60J 1/02* (2013.01); *B60J 1/18* (2013.01); *B60J 1/20* (2013.01); *B60W 40/08* (2013.01); *G01C 21/365* (2013.01); *G01C 21/3629* (2013.01); *G02B 27/0101* (2013.01); *G02B 27/0179* (2013.01); *G02F 1/163* (2013.01); *G06F 3/013* (2013.01); *H04N 9/3179* (2013.01); *B60W 2540/225* (2020.02); *G02B 2027/0187* (2013.01)

(58) Field of Classification Search
CPC ........ B60J 1/02; B60J 1/18; B60J 1/20; B60J 3/04; B60W 2540/225; B60W 40/08; G01C 21/365; G02B 27/0093; G02F 1/163; G06F 3/013
See application file for complete search history.

(56) References Cited

U.S. PATENT DOCUMENTS

| | | | | |
|---|---|---|---|---|
| 2003/0174295 A1* | 9/2003 | Yaniv | ................... | G03B 21/28 353/87 |
| 2013/0307706 A1* | 11/2013 | Kriezman | .............. | B60Q 1/503 340/988 |
| 2019/0346701 A1* | 11/2019 | Lam | ................... | G06K 9/00845 |

FOREIGN PATENT DOCUMENTS

KR 10-2013-0119144 A 10/2013

* cited by examiner

*Primary Examiner* — Ram A Mistry
(74) *Attorney, Agent, or Firm* — NSIP Law

(57) ABSTRACT

Provided is a system for controlling transparency of a vehicle window according to recognition of a gaze of a driver, the system including: an electrochromic film provided on a vehicle window and configured to control transparency according to a transparency control signal; a gaze detector configured to detect a gaze of a driver; a gaze determiner configured to determine whether the gaze of the driver is directed at the vehicle window on which the electrochromic film is located; and a controller configured to transmit the transparency control signal according to the determined gaze of the driver.

18 Claims, 6 Drawing Sheets

(51) Int. Cl.
*G06F 3/01* (2006.01)
*H04N 9/31* (2006.01)

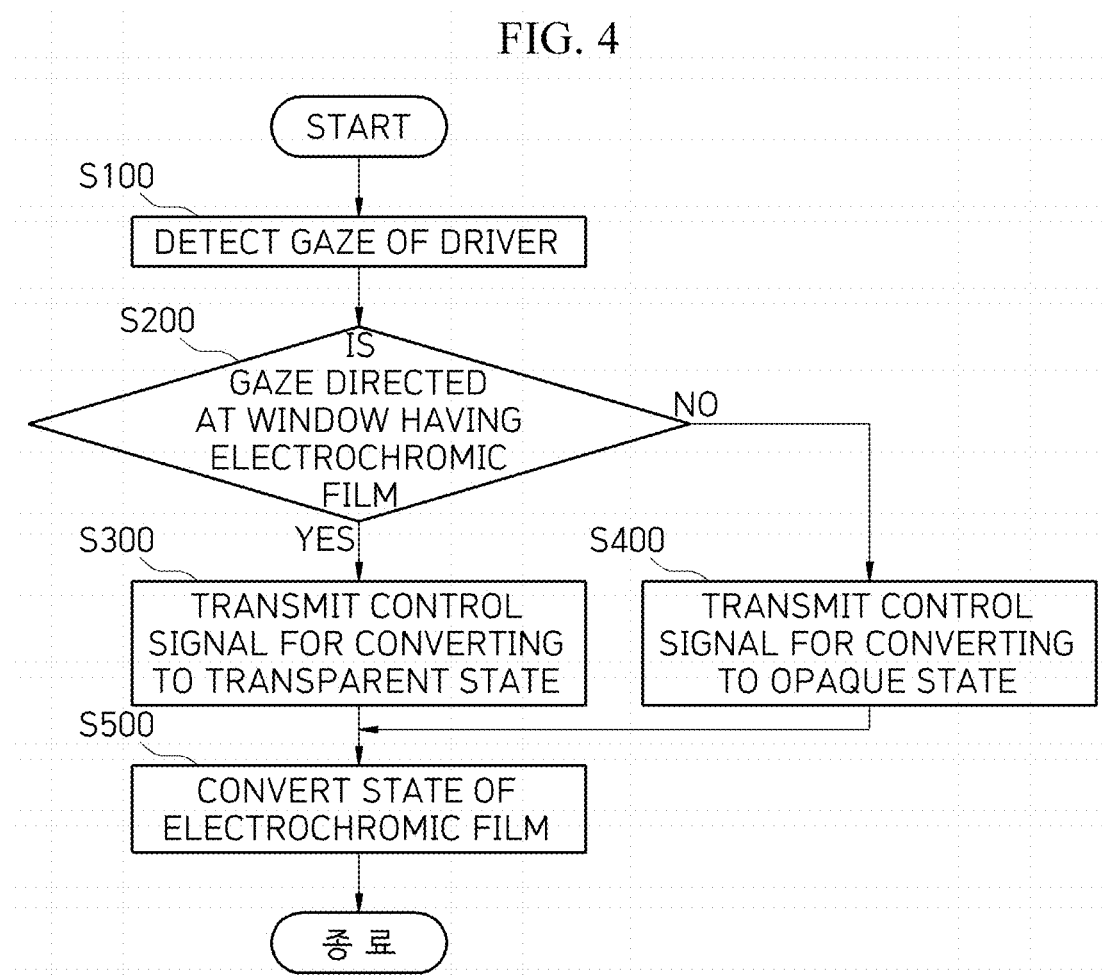

SYSTEM AND METHOD FOR CONTROLLING WINDOW TRANSPARENCY OF VEHICLE ACCORDING TO RECOGNITION OF DRIVER'S GAZE

CROSS-REFERENCE TO RELATED APPLICATION

This application claims priority to and the benefit of Korean Patent Applications No. 10-2019-0080773, filed on Jul. 4, 2019, the disclosures of which are incorporated herein by reference in its entirety.

BACKGROUND

1. Field of the Invention

The present invention relates to a system and method for controlling transparency of a vehicle window according to recognition of a driver's gaze, and more specifically, to a system and method for controlling transparency of a vehicle window according to recognition of a driver's gaze that is capable of adjusting window transparency of a vehicle according to a driver's gaze and allowing a vehicle window not reached by a driver's gaze to be opaque or providing advertisement information to the opaque vehicle window.

2. Discussion of Related Art

In general, advertising on a vehicle is achieved using a method of installing a separate display device outside the vehicle or a method of attaching or printing an advertisement leaflet and the like.

Among the above described methods, the method of advertising by installing a separate display device outside the vehicle has difficulty in installing and managing the display device. The display device may be provided at a portion, at which the window of vehicle is located, and used for advertisement, but in this case, the driver's view is obstructed.

Meanwhile, in order to reduce the cost for the display device, a light emitting diode (LED) lamp may be used for providing a simple phrase or the like as an advertisement, but it has a limitation on graphics and contents.

SUMMARY OF THE INVENTION

The present invention provides a system and method for controlling transparency of a vehicle window according to recognition of a driver's gaze that is capable of preventing the inside of the vehicle from being exposed to the outside while preventing the driver's view from being obstructed.

The present invention provides a system and method for controlling transparency of a vehicle window according to recognition of a driver's gaze that is capable of providing an advertisement outside while preventing the driver's view from being obstructed.

The technical objectives of the present invention are not limited to the above, and other objectives may become apparent to those of ordinary skill in the art based on the following description.

According to one aspect of the present invention, there is provided a system for controlling transparency of a vehicle window according to recognition of a gaze of a driver, the system including: an electrochromic film provided on a vehicle window and configured to control transparency according to a transparency control signal; a gaze detector configured to detect a gaze of a driver; a gaze determiner configured to determine whether the gaze of the driver is directed at the vehicle window on which the electrochromic film is located; and a controller configured to transmit the transparency control signal according to the determined gaze of the driver.

The system may further include a projector configured to transmit image information to the electrochromic film according to the transparency control signal of the controller.

The electrochromic film may be provided on a rear vehicle window.

The controller may provide the transparency control signal for causing the electrochromic film provided on a rear vehicle window to be converted to a transparent state when the gaze of the driver is directed at a rear-view mirror, and may provide the transparency control signal for causing the electrochromic film provided on the rear vehicle window to be converted to an opaque state when the gaze of the driver is directed ahead of the vehicle.

The controller may control an image provided from a projector to be projected onto the electrochromic film when the gaze of the driver is not directed at the rear-view mirror of the vehicle.

The electrochromic film may be provided on a front vehicle window.

The controller may provide the transparency control signal for causing the electrochromic film provided on the front vehicle window to be converted to a transparent state when the gaze of the driver is directed ahead of the vehicle.

The controller may provide the transparency control signal for causing the electrochromic film provided on the front vehicle window to be converted to an opaque state when the gaze of the driver is directed at an audio video navigation (AVN) system or a terminal of the vehicle.

The controller may control an image provided from the projector to be projected onto the electrochromic film when the gaze of the driver is directed at an audio video navigation (AVN) system or a terminal of the vehicle.

The controller may control the image provided from the projector to be projected onto the electrochromic film according to time.

According to another aspect of the present invention, there is provided a method of controlling transparency of a vehicle window according to recognition of a gaze of a driver, the method including: detecting, by a gaze detector, a gaze of a driver; determining, by a gaze determiner, whether the gaze of the driver is directed at a vehicle window on which a electrochromic film is located; transmitting, by a controller, a transparency control signal according to the determined gaze of the driver upon determining that the gaze of the driver is directed at the vehicle window on which the electrochromic film is located in the determination; and controlling, by the electrochromic film, the transparency according to the transparency control signal.

The method may further include, transmitting, by a projector, image information to the electrochromic film according to the transparency control signal.

The electrochromic film may be provided on a rear vehicle window.

The controller may provide the transparency control signal for causing the electrochromic film provided on a rear vehicle window to be converted to a transparent state when the gaze of the driver is directed at a rear-view mirror, and may provide the transparency control signal for causing the electrochromic film provided on the rear vehicle window to be converted to an opaque state when the gaze of the driver is directed ahead of the vehicle.

The transmitting of the transparency control signal according to the gaze of the driver may include controlling an image provided from a projector to be projected onto the electrochromic film when the gaze of the driver is not directed at the rear-view mirror of the vehicle. In this case, the electrochromic film may be provided on a front vehicle window.

The transmitting of the transparency control signal according to the gaze of the driver may include providing the transparency control signal for causing the electrochromic film provided on the front vehicle window to be converted to a transparent state when the gaze of the driver is directed ahead of the vehicle.

The transmitting of the transparency control signal according to the gaze of the driver may include providing the transparency control signal for causing the electrochromic film provided on the front vehicle window to be converted to an opaque state when the gaze of the driver is directed at an audio video navigation (AVN) system or a terminal of the vehicle.

The transmitting of the transparency control signal according to the gaze of the driver may include controlling an image provided from the projector to be projected onto the electrochromic film when the gaze of the driver is directed at an audio video navigation (AVN) system or a terminal of the vehicle.

The transmitting of the transparency control signal according to the gaze of the driver may include controlling the image provided from the projector to be projected onto the electrochromic film according to time.

BRIEF DESCRIPTION OF THE DRAWINGS

FIG. 4 is a flowchart showing a method of controlling the transparency of a vehicle window according to recognition of a driver's gaze according to an embodiment of the present invention.

DETAILED DESCRIPTION OF EXEMPLARY EMBODIMENTS

Hereinafter, the above and other objectives, advantages, and features of the present invention and manners of achieving them will become readily apparent with reference to descriptions of the following detailed embodiments when considered in conjunction with the accompanying drawings. However, the present invention is not limited to such embodiments and may be embodied in various forms. The embodiments to be described below are provided only to assist those skilled in the art in fully understanding the objectives, constitutions, and the effects of the invention, and the scope of the present invention is defined only by the appended claims. Meanwhile, terms used herein are used to aid in the explanation and understanding of the embodiments and are not intended to limit the scope and spirit of the present invention. It should be understood that the singular forms "a," "an," and "the" also include the plural forms unless the context clearly dictates otherwise. The terms "comprises," "comprising," "includes," and/or "including," when used herein, specify the presence of stated features, integers, steps, operations, elements, components and/or groups thereof and do not preclude the presence or addition of one or more other features, integers, steps, operations, elements, components, and/or groups thereof.

Figure 1:
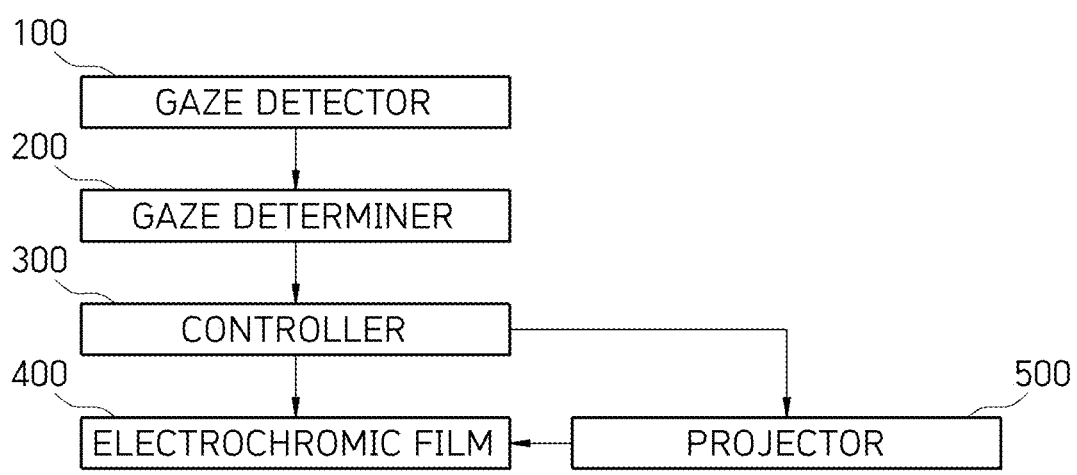
FIG. 1 is a block diagram illustrating a system for controlling the transparency of a vehicle window according to recognition of a driver's gaze according to an embodiment of the present invention.

Hereinafter, exemplary embodiments of the present invention will be described in detail with reference to the accompanying drawings. FIG. 1 is a block diagram illustrating a system for controlling transparency of a vehicle window according to recognition of a gaze of a driver according to an embodiment of the present invention.

Referring to FIG. 1, the system for controlling transparency of a vehicle window according to recognition of a gaze of a driver according to the embodiment of the present invention includes a gaze detector 100, a gaze determiner 200, a controller 300, an electrochromic film 400, and a projector 500.

The gaze detector 100 is provided in a room mirror of the vehicle to detect a gaze of a driver. The gaze detector 100 according to the embodiment of the present invention may detect the gaze of the driver using a camera.

In addition, the gaze determiner 200 determines whether the gaze of the driver is directed at a vehicle window on which the electrochromic film 400 is located. In the embodiment of the present invention, a method of determining the gaze of the driver may be achieved using various image processing algorithms without limitation.

In addition, the controller 300 transmits a transparency control signal according to the determined gaze of the driver to the electrochromic film 400. Here, the transparency control signal is information for controlling the transparency of the electrochromic film 400, and the transparency of the electrochromic film 400 may be implemented as transparent or opaque.

The electrochromic film 400 is provided on a vehicle window and controls the transparency according to the transparency control signal of the controller 300. The electrochromic film 400 according to the embodiment may be provided using one of a suspended particle device (SPD) and a polymer dispersed liquid crystal (PDLC).

Therefore, according to the embodiment of the present invention, the gaze of the driver is detected, and the transparency of the electrochromic film 400 is controlled to be transparent for a window that is looked at by the driver and controlled to be opaque for a window that is not looked at by the driver, so that the inside of the vehicle is prevented from being exposed to the outside without obstructing the visibility of the driver.

In addition, according to the embodiment of the present invention, image information is transmitted by the projector 500 and is projected onto the electrochromic film 400 according to the transparency control signal of the controller 300.

In this case, the image information provided through the projector 500 is transmitted onto the electrochromic film 400 that is in an opaque state. Therefore, the image information is able to be projected onto the electrochromic film 400 and exposed to the outside.

Figure 2A:
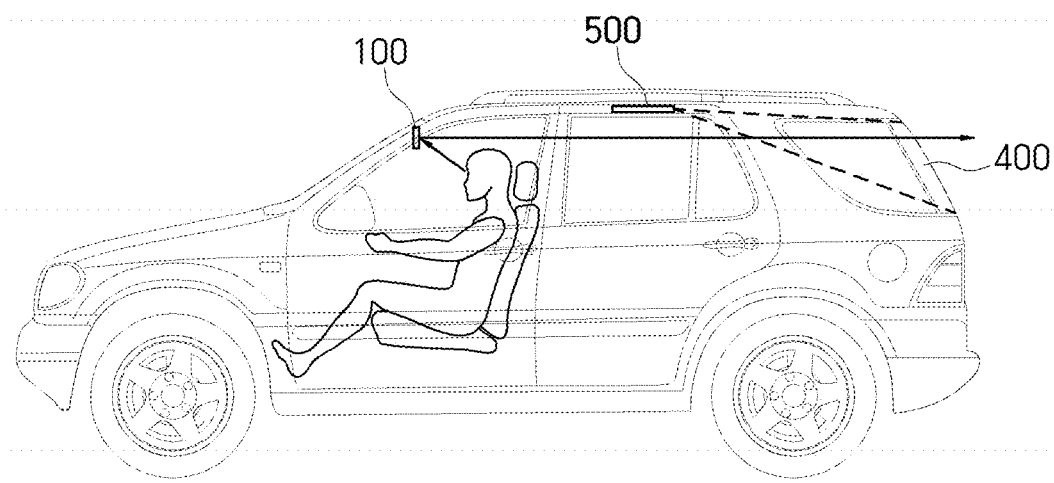
FIGS. 2A and 2B are reference diagrams for describing an operation of an electrochromic film and a projector according to detection of a driver's gaze according to an embodiment of the present invention.
Figure 2B:
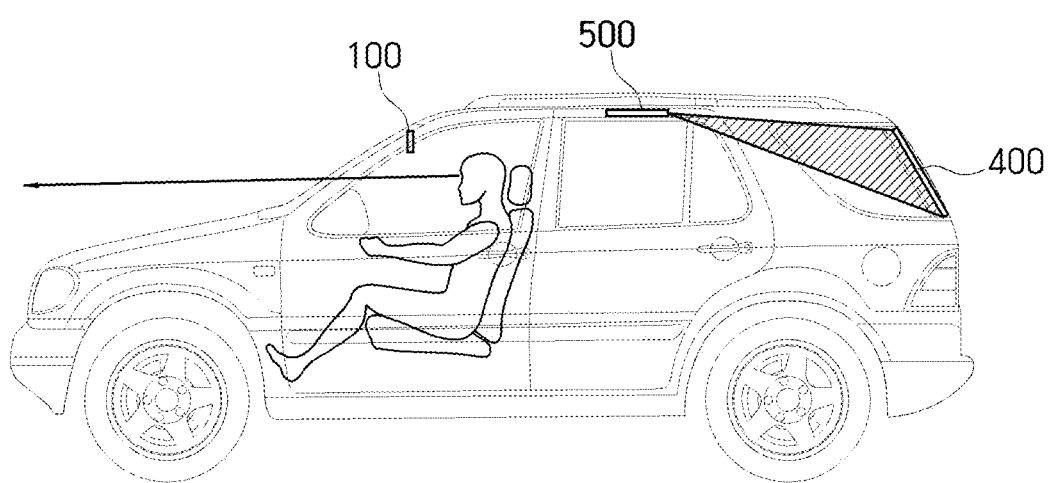

Hereinafter, an example case in which the electrochromic film 400 is provided on a rear vehicle window will be described with reference to FIGS. 2A and 2B.

The gaze detector 100 may be provided in the rear-view mirror of the vehicle, the electrochromic film 400 may be provided on the rear vehicle window, and the projector 500 may be installed on a ceiling inside the vehicle.

In this state, when the driver looks at the rear-view mirror to look behind the vehicle, the gaze detector 100 provided in the rear-view mirror of the vehicle may detect that the driver is looking at the rear-view mirror and may identify that the driver desires to look at the rear window that is provided with the electrochromic film 400.

Then, the controller 300 provides a transparency control signal to the electrochromic film 400 such that the driver is able to look behind the vehicle through the rear-view mirror.

Accordingly, the electrochromic film 400 converts the transparency into a transparent state according to the transparency control signal. Therefore, the driver may see behind the vehicle through the rear-view mirror.

On the other hand, when the driver is not looking at the rear-view mirror and looks ahead of the vehicle, the gaze detector 100 may identify that the driver is not in a state of looking at the rear-view mirror to look behind the vehicle, detecting that the gaze of the driver is directed ahead of the vehicle.

Then, the controller 300 provides a transparency control signal to the electrochromic film 400 provided on the rear window such that the transparency of the electrochromic film 400 is converted into an opaque state. The controller 300 of the present invention is preferably performed by a processor of a computer and may be implemented in software or in a hardware form such as a field programmable gate array (FPGA) or an application specific integrated circuit (ASIC).

Accordingly, the electrochromic film 400 provided on the rear vehicle window converts the transparency into an opaque state. When the electrochromic films 400 are provided on both side windows of the vehicle, the inside of the vehicle can be prevented from being exposed to the outside.

On the other hand, when the driver is not looking at the rear-view mirror, the controller 300 may control an image provided from the projector 500 to be projected onto the electrochromic film 400 provided on the rear vehicle window, thereby allowing an advertisement provided by the vehicle to be seen from the outside of the vehicle.

Figure 3A:
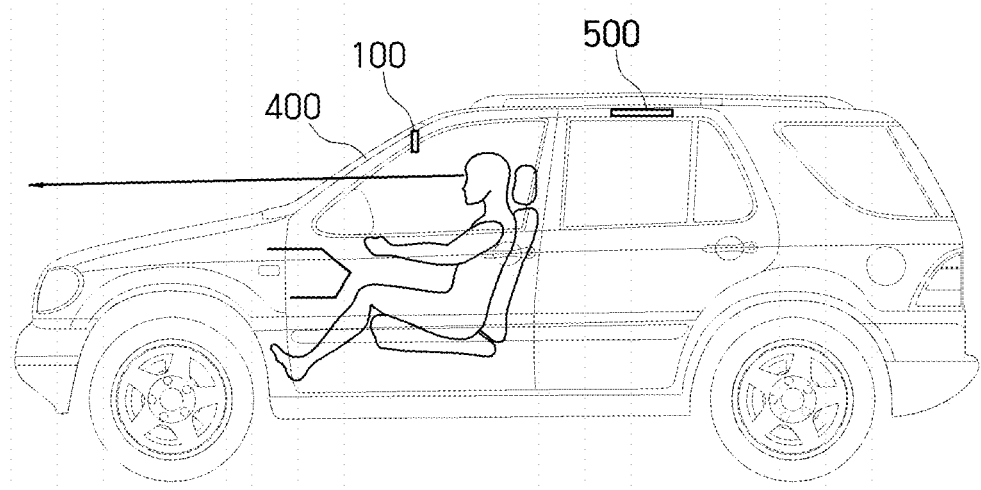
FIGS. 3A and 3B are reference diagrams for describing an operation of an electrochromic film and a projector according to detection of a driver's gaze according to another embodiment of the present invention.
Figure 3B:
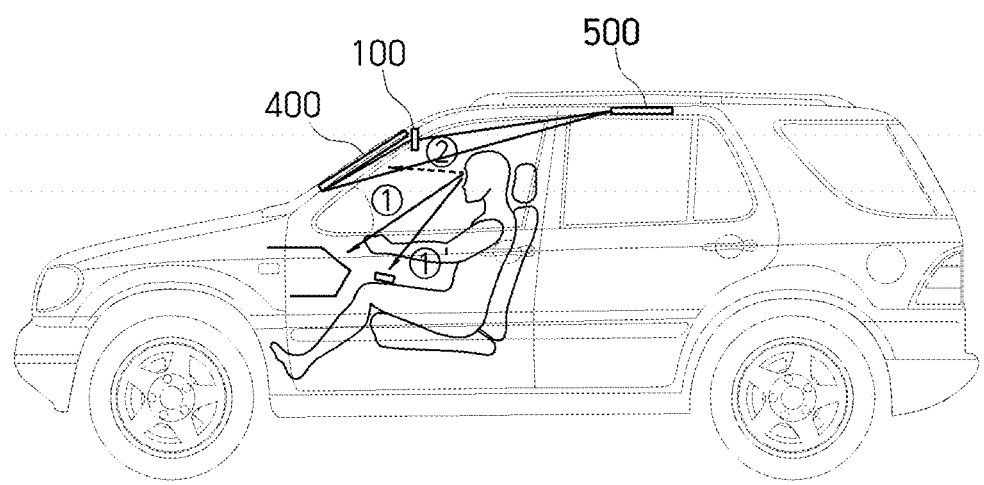

Referring to FIGS. 3A and 3B, the gaze detector 100 and the controller 300 according to another embodiment of the present invention have the same configurations as those of the above embodiment, and only the position of the electrochromic film 400 is different as the electrochromic film 400 is provided on a front vehicle window.

When it is identified by the gaze detector 100 that the driver is looking forward, the controller 300 provides a transparency control signal such that the electrochromic film provided on the front vehicle window is converted into a transparent state.

On the other hand, when it is identified by the gaze detector 100 that the driver is looking at an audio-video-navigation (AVN) system of the vehicle or an arbitrary terminal, the controller 300 provides a transparency control signal such that the electrochromic film 400 provided on the front vehicle window is converted into an opaque state.

In addition, the controller 300 controls an image provided from the projector 500 to be projected onto the electrochromic film 400. In this case, when the projector 500 is provided with a mirroring function, screen information of the AVN system of the vehicle or the arbitrary terminal may be provided to the electrochromic film 400 through the projector 500 through the mirroring function.

Further, according to still another embodiment of the present invention, a plurality of electrochromic films 400 may be provided on the front vehicle window.

In this case, when it is identified by the gaze detector 100 that the driver is looking forward, the controller 300 allows the transparency of the electrochromic film 400 provided on the front window to be converted into a transparent state. However, even when the driver is looking forward, since the driver is unable to look at all the areas of the front window, the controller 300 converts the transparency of a portion of the electrochromic films 400 that is not looked at by the driver into an opaque state, and controls an image to be projected through the projector 500 onto only the opaque portion of the electrochromic film 400.

Therefore, according to the embodiment of the present invention, image information of the vehicle can be provided to the outside without obstructing the visibility of the driver during driving of the vehicle.

According to still another embodiment of the present invention, the controller 300 may control an image provided from the projector 500 to be projected onto the electrochromic film 400 according to time.

In one embodiment and another embodiment of the present invention, image information output from the projector 500 is transmitted when the electrochromic film 400 is in an opaque state, while in still another embodiment, image information is transmitted when the transparency of the electrochromic film 400 is in a transparent state in response to a predetermined time or an environment where an illuminance state has a predetermined value or less, so that a head up display (HUD) effect is provided.

Hereinafter, a method of controlling transparency of a vehicle window according to recognition of a gaze of a driver according to an embodiment of the present invention will be described with reference to FIG. 4.

First, the gaze detector 100 provided in the rear-view mirror of the vehicle detects a gaze of the driver (S100).

The gaze determiner 200 determines whether the gaze of the driver is directed at a vehicle window on which the electrochromic film 400 is located (S200). Operation S200 of determining of whether the gaze of the driver is directed at a vehicle window on which the electrochromic film 400 is located by the gaze determiner 200 may be performed differently depending on the location where the electrochromic film 400 is installed.

For example, when the electrochromic film 400 is provided on the rear vehicle window, the gaze determiner 200 may determine whether the driver is looking at the rear-view mirror to determine that the drivers is looking behind the vehicle, and when the electrochromic film 400 is provided on the front vehicle window, the gaze determiner 200 may determine whether the gaze of the driver is directed forward to determine that the driver is looking ahead of the vehicle.

When it is determined in the determination operation S200 that the gaze of the driver is directed at a vehicle window on which the electrochromic film 400 is located (YES in operation S200), the controller transmits a transparency control signal to the electrochromic film 400 such that the electrochromic film 400 is converted into a transparent state according to the determined gaze of the driver (S300).

On the other hand, when it is determined in the determination operation S200 that the gaze of the driver is not directed at a vehicle window on which the electrochromic film 400 is located (NO in operation S200), the controller transmits a transparency control signal to the electrochromic film 400 such that the electrochromic film 400 is converted into an opaque state (S400).

Accordingly, the electrochromic film 400 controls the transparency according to the transparency control signal for controlling the transparency of the electrochromic film 400 that is transmitted from the controller 300 (S500).

That is, when the gaze of the driver is directed at the rear-view mirror, the electrochromic film 400 converts the transparency into a transparent state according to a transparency control signal for converting the transparency into a transparent state that is provided from the controller 300, and when the gaze of the driver is directed forward rather than directed at the rear-view mirror, the electrochromic film 400 converts the transparency into an opaque state according to a transparency control signal provided from the controller 300.

Meanwhile, although the controller 300 according to the embodiment of the present invention transmits the transparency control signal to only the electrochromic film 400, the controller 300 may transmit the transparency control signal not only to the electrochromic film 400 but also to the projector 500 according to another embodiment of the present invention such that image information is controlled to be projected onto the electrochromic film 400 through the projector 500.

That is, when the gaze of the driver is not directed at the rear-view mirror of the vehicle, the projector 500 receives a transparency control signal for converting the transparency of the electrochromic film 400 into an opaque state from the controller 300, and upon reception of the transparency control signal, transmits image information to the electrochromic film 400 such that the image information is projected onto the electrochromic film 400.

On the other hand, according to another embodiment of the present invention, in a case when the electrochromic film 400 is provided on the front vehicle window, when the gaze of the driver is directed forward, the controller 300 transmits a transparency control signal to the electrochromic film 400 provided on the front vehicle window such that the electrochromic film 400 is converted into a transparent state.

On the contrary, when the gaze of the driver is directed at an AVN system of the vehicle or an arbitrary terminal rather than directed forward, the controller 300 transmits, to the electrochromic film 400 provided on the front vehicle window, a transparency control signal for converting the electrochromic film 400 into an opaque state, and transmits, to the projector 500 as well, the transparency control signal such that an image provided from the projector 500 is projected onto the electrochromic film 400.

Meanwhile, the transmission of the transparency control signal according to the gaze of the driver may include allowing image information provided from the projector 500 to be projected onto the electrochromic film 400 according to time.

As is apparent from the above, a driver's gaze is detected, and the transparency of an electrochromic film is controlled to be transparent for a window that is looked at by the driver, and controlled to be opaque for a window that is not looked at by the driver, thereby preventing the visibility of the driver from being obstructed while preventing the inside of the vehicle from being exposed to the outside.

Although the present invention has been described with reference to the embodiments, a person of ordinary skill in the art should appreciate that various modifications, equivalents, and other embodiments are possible without departing from the scope and sprit of the present invention. Therefore, the embodiments disclosed above should be construed as being illustrative rather than limiting the present invention. The scope of the present invention is not defined by the above embodiments but by the appended claims of the present invention.

What is claimed is:

1. A system for controlling transparency of a vehicle window according to recognition of a gaze of a driver, the system comprising:
    an electrochromic film provided on a vehicle window and configured to control transparency according to a transparency control signal;
    a gaze detector configured to detect a gaze of a driver;
    a gaze determiner configured to determine whether the gaze of the driver is directed at the vehicle window on which the electrochromic film is located; and
    a controller configured to transmit the transparency control signal according to the determined gaze of the driver,
    wherein the controller is configured to control an image provided from a projector to be projected onto the electrochromic film when the gaze of the driver is not directed at the rear-view mirror of the vehicle.

2. The system of claim 1, further comprising a projector configured to transmit image information to the electrochromic film according to the transparency control signal of the controller.

3. The system of claim 2, wherein the electrochromic film is provided on a rear vehicle window.

4. The system of claim 2, wherein the electrochromic film is provided on a front vehicle window.

5. The system of claim 4, wherein the controller provides the transparency control signal for causing the electrochromic film provided on the front vehicle window to be converted to a transparent state when the gaze of the driver is directed ahead of the vehicle.

6. The system of claim 5, wherein the controller provides the transparency control signal for causing the electrochromic film provided on the front vehicle window to be converted to an opaque state when the gaze of the driver is directed at an audio video navigation (AVN) system or a terminal of the vehicle.

7. The system of claim 4, wherein the controller controls an image provided from the projector to be projected onto the electrochromic film when the gaze of the driver is directed at an audio video navigation (AVN) system or a terminal of the vehicle.

8. The system of claim 7, wherein the controller controls the image provided from the projector to be projected onto the electrochromic film according to time.

9. The system of claim 1, wherein the controller provides the transparency control signal for causing the electrochromic film provided on the rear vehicle window to be converted to a transparent state when the gaze of the driver is directed at a rear-view mirror and provides the transparency control signal for causing the electrochromic film provided on the rear vehicle window to be converted to an opaque state when the gaze of the driver is directed ahead of the vehicle.

10. A method of controlling transparency of a vehicle window according to recognition of a gaze of a driver, the method comprising:
    detecting, by a gaze detector, a gaze of a driver;
    determining, by a gaze determiner, whether the gaze of the driver is directed at a vehicle window on which a electrochromic film is located;

transmitting, by a controller, a transparency control signal according to the determined gaze of the driver upon determining that the gaze of the driver is directed at the vehicle window on which the electrochromic film is located in the determination; and controlling, by the electrochromic film, the transparency according to the transparency control signal, wherein the transmitting of the transparency control signal according to the gaze of the driver includes controlling an image provided from a projector to be projected onto the electrochromic film when the gaze of the driver is not directed at the rear-view mirror of the vehicle.

11. The method of claim 10, further comprising transmitting, by a projector, image information to the electrochromic film according to the transparency control signal.

12. The method of claim 11, wherein the electrochromic film is provided on a rear vehicle window.

13. The method of claim 11, wherein the electrochromic film is provided on a front vehicle window.

14. The method of claim 13, wherein the transmitting of the transparency control signal according to the gaze of the driver includes providing the transparency control signal for causing the electrochromic film provided on the front vehicle window to be converted to a transparent state when the gaze of the driver is directed ahead of the vehicle.

15. The method of claim 14, wherein the transmitting of the transparency control signal according to the gaze of the driver includes providing the transparency control signal for causing the electrochromic film provided on the front vehicle window to be converted to an opaque state when the gaze of the driver is directed at an audio video navigation (AVN) system or a terminal of the vehicle.

16. The method of claim 13, wherein the transmitting of the transparency control signal according to the gaze of the driver includes controlling an image provided from the projector to be projected onto the electrochromic film when the gaze of the driver is directed at an audio video navigation (AVN) system or a terminal of the vehicle.

17. The method of claim 16, wherein the transmitting of the transparency control signal according to the gaze of the driver includes controlling the image provided from the projector to be projected onto the electrochromic film according to time.

18. The method of claim 10, wherein the controller provides the transparency control signal for causing the electrochromic film provided on the rear vehicle window to be converted to a transparent state when the gaze of the driver is directed at a rear-view mirror and provides the transparency control signal for causing the electrochromic film provided on the rear vehicle window to be converted to an opaque state when the gaze of the driver is directed ahead of the vehicle.

* * * * *